(12) United States Patent
Guy et al.

(10) Patent No.: US 6,179,492 B1
(45) Date of Patent: Jan. 30, 2001

(54) METHOD OF AND APPARATUS FOR DUPLICATING, UPGRADING AND CONFIGURING HARD DISK DRIVES

(75) Inventors: Gideon Guy, Van Nuys; Terence Fugazzi, Simi Valley, both of CA (US)

(73) Assignee: Intelligent Computer Solutions, Inc., Chatsworth, CA (US)

( * ) Notice: Under 35 U.S.C. 154(b), the term of this patent shall be extended for 0 days.

(21) Appl. No.: 09/097,558

(22) Filed: Jun. 15, 1998

(51) Int. Cl.⁷ .................................................. G06F 11/30
(52) U.S. Cl. .............................................................. 395/712
(58) Field of Search ............................ 709/221; 395/712

(56) References Cited

U.S. PATENT DOCUMENTS

| | | |
|---|---|---|
| 4,494,156 | 1/1985 | Kadison et al. . |
| 4,727,509 | 2/1988 | Johnson et al. . |
| 4,862,411 | 8/1989 | Dishon et al. . |
| 4,864,431 | 9/1989 | Murase . |
| 4,866,601 | 9/1989 | DuLac et al. . |
| 5,167,020 | 11/1992 | Kahn et al. . |
| 5,235,683 | 8/1993 | Dahlerud . |
| 5,241,526 | 8/1993 | Ishii . |
| 5,495,610 | * 2/1996 | Shing et al. ................................ 5/71 |
| 5,797,016 | * 8/1998 | Chen et al. ............................ 717/11 |
| 5,860,012 | * 1/1999 | Luu ....................................... 395/712 |

* cited by examiner

Primary Examiner—Jack A. Lane
(74) Attorney, Agent, or Firm—Thomas I. Rozsa; Tony D. Chen; Jerry Fong

(57) ABSTRACT

A method of and apparatus for utilizing a computer software program to implement a process of performing optional file operations to a data storage media. The method comprises the steps of: (1) selecting user files to be saved; (2) storing the selected user files; (3) performing optional file operations to the data storage media; and (4) restoring the stored selected user files back to the data storage media. This provides a fast, easy and convenient way to perform said optional data operation to any data storage media while preventing user selected files from being altered during the operation.

30 Claims, 2 Drawing Sheets

METHOD OF AND APPARATUS FOR DUPLICATING, UPGRADING AND CONFIGURING HARD DISK DRIVES

BACKGROUND OF THE INVENTION

1. Field of The Invention

The present invention generally relates to the technical field of manipulating and handling of direct access storage devices. Particularly, the present invention relates to a method of and an apparatus for duplicating, upgrading and configuring hard disk drives installed in personal computer and workstations used in a networking environment. In addition, the present invention relates to the field of "cloning" disk drives. Cloning is the process of copying all files and operating systems from a master image into a target computer, overriding any existing ones. The present invention directly relates to the field of quickly and efficiently saving selected files, cloning the new files and then restoring the files saved on the disk drive. The present invention also relates to an efficient, quick and convenient system for backing up and restoring data files.

2. Description of The Prior Art

The following prior art references are found to be pertinent to the relevant fields of art of the present invention:

1. U.S. Pat. No. 4,494,156 issued to Kadison et al. on Jan. 15, 1985 for "Selectable Format Computer Disk Copier Machine" (hereafter "the Kadison Patent");
2. U.S. Pat. No. 4,727,509 issued to Johnson et al. on Feb. 23, 1988 for "Master/Slave System For Replicating/Formatting Flexible Magnetic Diskettes" (hereafter "the Johnson Patent");
3. U.S. Pat. No. 4,862,411 issued to Dishon et al. on Aug. 29, 1989 for "Multiple Copy Data Mechanism On Synchronous Disk Drives" (hereafter "the Dishon Patent");
4. U.S. Pat. No. 4,864,431 issued to Murase on Sep. 5, 1989 for "Tape Dubbing Apparatus In Which Each Of A Plurality of Slave Recorders Is Operated In Synchronism With A Master Player" (hereafter "the Murase Patent");
5. U.S. Pat. No. 4,866,601 issued to DuLac et al. on Sep. 12, 1989 for "Digital Data Bus Architecture For Computer Disk Drive Controller" (hereafter "the DuLac Patent");
6. U.S. Pat. No. 5,167,020 issued to Kahn et al. on Nov. 24, 1992 for "Serial Data Transmitter With Dual Buffers Operating Separately And Having Scan And Self Test Modes" (hereafter "the Kahn Patent");
7. U.S. Pat. No. 5,235,683 issued Dahlerud on Aug. 10, 1993 for "Method And Apparatus For Accessing Peripheral Storage With Asychronized Individual Requests To A Host Processor" (hereafter "the Dahlerud Patent"); and
8. U.S. Pat. No. 5,241,526 issued to Ishii on Aug. 31, 1993 for "Recording Data Processing System For Optical Recording" (hereafter "the Ishii Patent").

The Kadison Patent discloses a selectable format computer disk copier machine. It uses a host computer, disk controller, disk drive, and mechanical disk feeder in order to automatically copy information onto each of a number of disks.

The Johnson Patent discloses a master/slave system for replicating/formatting flexible magnetic diskettes. It comprises a CPU section which has a Kopy Module and two associated manual modules, and is coupled by a daisy-chained bidirectional data Way to a plurality of slave stations. The Kopy Module stores a plurality of possible diskette formats as well as operator-introduced copy and duplicating instructions. Blank diskettes are fed into the slaves and the blank diskettes are formatted with information supplied by the master. A translator contained within the Kopy Module allows diskettes bearing all of the commonly used data encoding techniques to be replicated.

The Dishon Patent discloses a multiple copy data mechanism on synchronous disk drives. The system includes a host central processing unit (CPU) which is connected to control units and a plurality of direct access storage devices (DASDs) are predetermined to record the same data from the CPU. The DASDs are kept rotationally synchronized with one another except during the power up. The DASD synchronization is controlled and maintained by synchronization control means independent of any commands from the CPU. When one or more commands are transferred from the CPU to a control unit over a single data transfer path between them, desired identical records on the synchronized DASDs are concurrently located while the DASDs are reconnected to the data transfer path. Upon locating the desired identical records, the DASDs are reconnected to the data transfer path. Then, a write command is transferred from the CPU to the control unit form concurrently recording the same data onto the synchronized DASDs at the desired record locations.

The Murase Patent discloses a tape dubbing apparatus in which each of a plurality of slave recorders is operated in synchronism with a master player. Each slave recorder has at least one rotary magnetic head for repeatedly scanning a respective magnetic recording tape and receiving from the master tape player a signal to be recorded along with an external sync or reference signal. Each slave recorder is provided with a respective time base adjusting memory in which the signal to be recorded is written in synchronism with the external reference signal and from which the signal to be recorded is read-out in synchronism with a reference pulse generated in timed relation to a predetermined rotational position of the respective rotary magnetic head.

The DuLac Patent discloses a digital data bus architecture for a computer disk drive controller. The disk drive controller bus architecture enables the controller to be interfaced with disk drives having widely varying data format requirements in a configuration that is user-programmable and implementable on a single semiconductor chip. The bus architecture comprises a disk drive parameter storage section, a disk drive parameter comparator/interface section and a set of associated data buses, coupled between a disk drive control processor and the disk drive.

The Dahlerud Patent discloses a method and apparatus for accessing peripheral storage with asychronized individual requests to a host processor. The apparatus duplicates data from multiple magnetic disks and tapes, where the host processor functions as a data source and a plurality of peripheral storage devices function as data receivers, and are connected to one another via a data bus and a control bus.

The Kahn Patent discloses a serial data transmitter with dual buffers operating separately and having scan and self test modes.

The Ishii Patent discloses a recording data producing system for an optical recording. The audio information and the video information are converted by a computer into the information conforming to the CD-I data format, in which the amount of the converted software corresponds to at least the capacity of an optical disc and is stored in the memory.

One of the common methods developed by the PC industry to address the need of duplicating HDDs is to use a network to copy files from a centralized source HDD to a target HDD on respective workstations. It first prepares an "image" of the HDD on a centralized file server. Once the image is available, the user activates the computers' built-in functions with the network access functions to copy files from the file server, via the network, to the target HDD. This method is most suitable when the HDD is installed in the computer's enclosure as part of the PC manufacturing process. The HDD is not removed from the computer enclosure. This duplicating process is known as the "cloning" of the HDDs which erases all old files on an HDD and then replaces them with new copied files.

The present invention is designed to solve an existing problem faced by network system administrators when imaging existing user workstations by cloning the HDDs. The problem with prior art cloning software programs is that virtually all cloning tools in existence overwrite user files. The systems administrator is required to advise the users to save their personal files on the server before the cloning operation takes place, but no automated tool exists in the conventional art to aid in this task. As a result, if the user forgets to save key files, when the cloning operation takes place, all of the files in the user's workstation are wiped out and a new file system is implemented onto the hard disk drive. This presents a major problem because key files may be wiped out and may be difficult to replace if no additional copies exist.

It is therefore desirable to have a new and improved cloning system to assist the user to save all of his/her local working files (for example Microsoft® Word files, Excel files, etc.) to a safe place immediately before the imaging process takes place and thereafter to restore the desired files right after the cloning is completed.

SUMMARY OF THE INVENTION

The present invention is a method of and apparatus for duplicating, upgrading and configuring hard disk drives (HDDs) utilizing a specially designed computer software program to assist the user in saving all of his/her local working files (e.g., Microsoft® Word files, Excel files, etc.) to a safe place (either on the server, or locally) immediately before the duplicating process takes place. It will also restore the user files right after the cloning is completed.

One problem in the existing cloning process is that the cloning tools overwrite user files without an automated process to save the user files. As a result, if a workstation user does not save his or her key files, all of the files in the user's workstation are wiped out when the cloning operation takes place.

It is therefore an object of the present invention to enable a user to easily, quickly and conveniently select which files he/she wants to save before cloning takes place and to give the user the option to save the selected files by any desired selection process such as (i) by applications software, for example saving all files in Microsoft® Word, or (ii) saving all files of a known file extension, such as ".doc"; or (iii) saving files by selecting each specific file that the user wants saved.

It is also an object of the present invention to enable the user to configure the files to be saved into class definitions or other definitions before the saving process begins.

It is another object of the present invention to then enable the user to perform the store operation to read the configured files and to then compress and save all selected files.

It is a further object of the present invention to give the user the option of when to store the saved files, which option includes: (i) storing the saved compressed files into a pre-existing partition on the disk drive which prevents the saved compressed files from being wiped out when cloning takes place; or (ii) creating a partition on the disk drive and then storing the saved compressed files into the newly created partition on the disk drive which prevents the saved compressed files from being wiped out when cloning takes place; or (iii) transferring the saved compressed files to a server to be safely stored while cloning of the disk drive takes place.

It is also a further object of the present invention to give the user the option to restore the saved compressed files onto the disk drive after the cloning operation takes place and then install the new files and operating system on the disk drive or alternatively first install the new operating system and files on the disk drive after cloning takes place and then restore the saved compressed files on the disk drive.

It is an additional object of the present invention to provide the user with a graphical user interface to enable the user to implement the above process.

It is also another object of the present invention to enable the user to operate the system during the day, make the selection process to be sure all desired files are saved, and then have the cloning process take place at night when the user is away while all files that were desired to be saved have been safely stored as discussed above and thereby not accidentally wiped out during the cloning process, It is still another object of the present invention to enable the user to select the files to be stored by application. In this process: (i) the program extracts from the registry all file extensions; (ii) the program associates each of the extensions with an application, (iii) the user selects which application files are to be stored; and (iv) the present invention marks all extensions that are associated with the selection application as a class object.

Described generally, the present invention is a method of utilizing a computer software program to implement a process of performing optional file operations on a hard disk drive, comprising the steps of: (a) creating a system overriding file; (b) selecting user files to be saved; (c) generating a configuration file containing classifications and definitions of the system overriding file and the selected user files; (d) storing the selected user files; (e) duplicating the image of the collection of hard disk contents to the hard disk drive; and (f) restoring the stored selected user files back to the hard disk drive; (g) whereby the method provides a fast, easy and convenient way to perform the system operation on the hard disk drive while preventing the user selected files from being altered during the file operation process.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention method is implemented by utilizing a computer software program. It is a process used in connection with performing file operations on hard disk drives (HDDs). It provides a fast, easy and convenient way to allow the user perform such file operations on the user's HDD while saving the user selected files from being altered during the duplication process.

Figure 1:
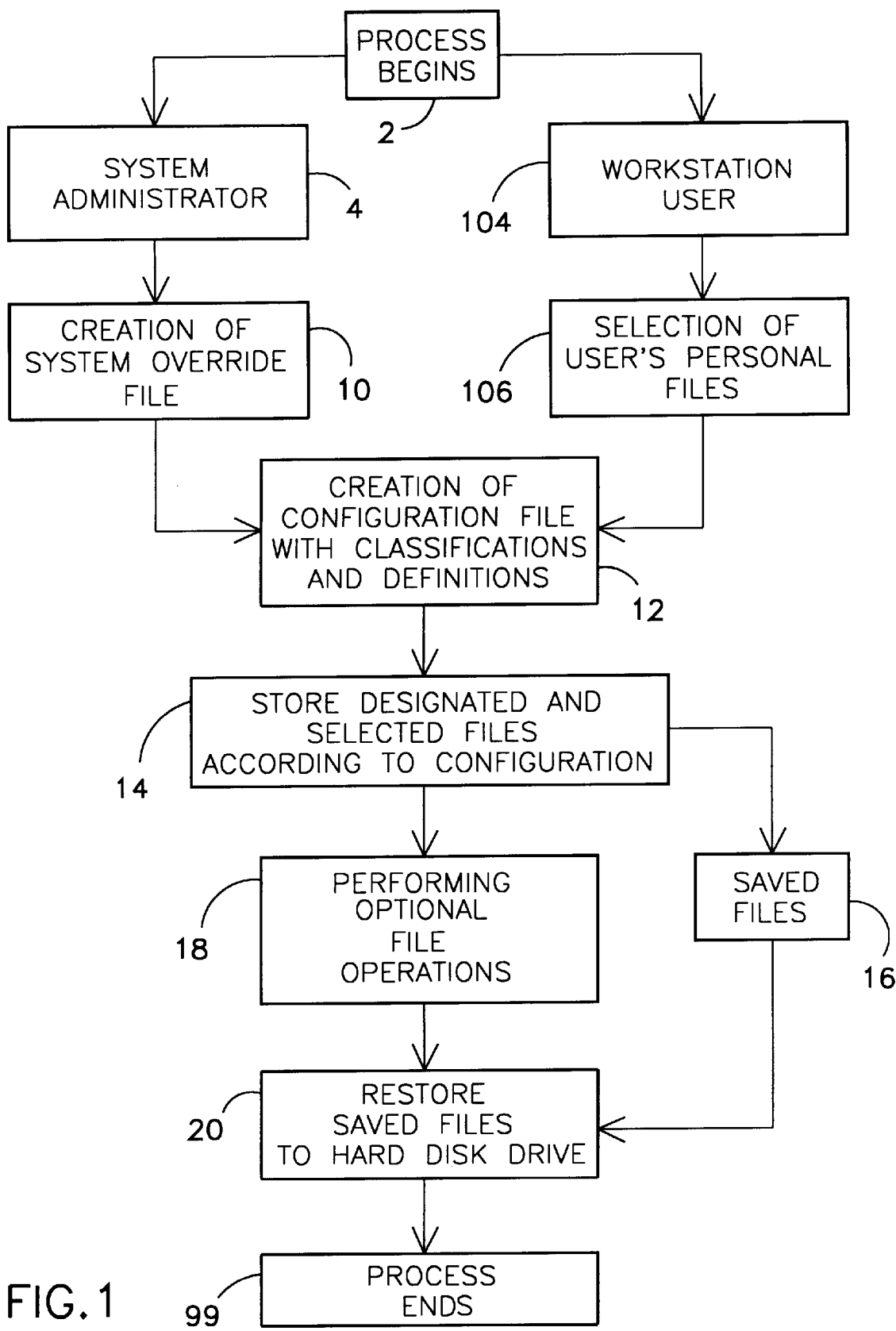
FIG. 1 is an illustrative flow chart block diagram of one of the preferred embodiments of the present invention method.
Figure 2:
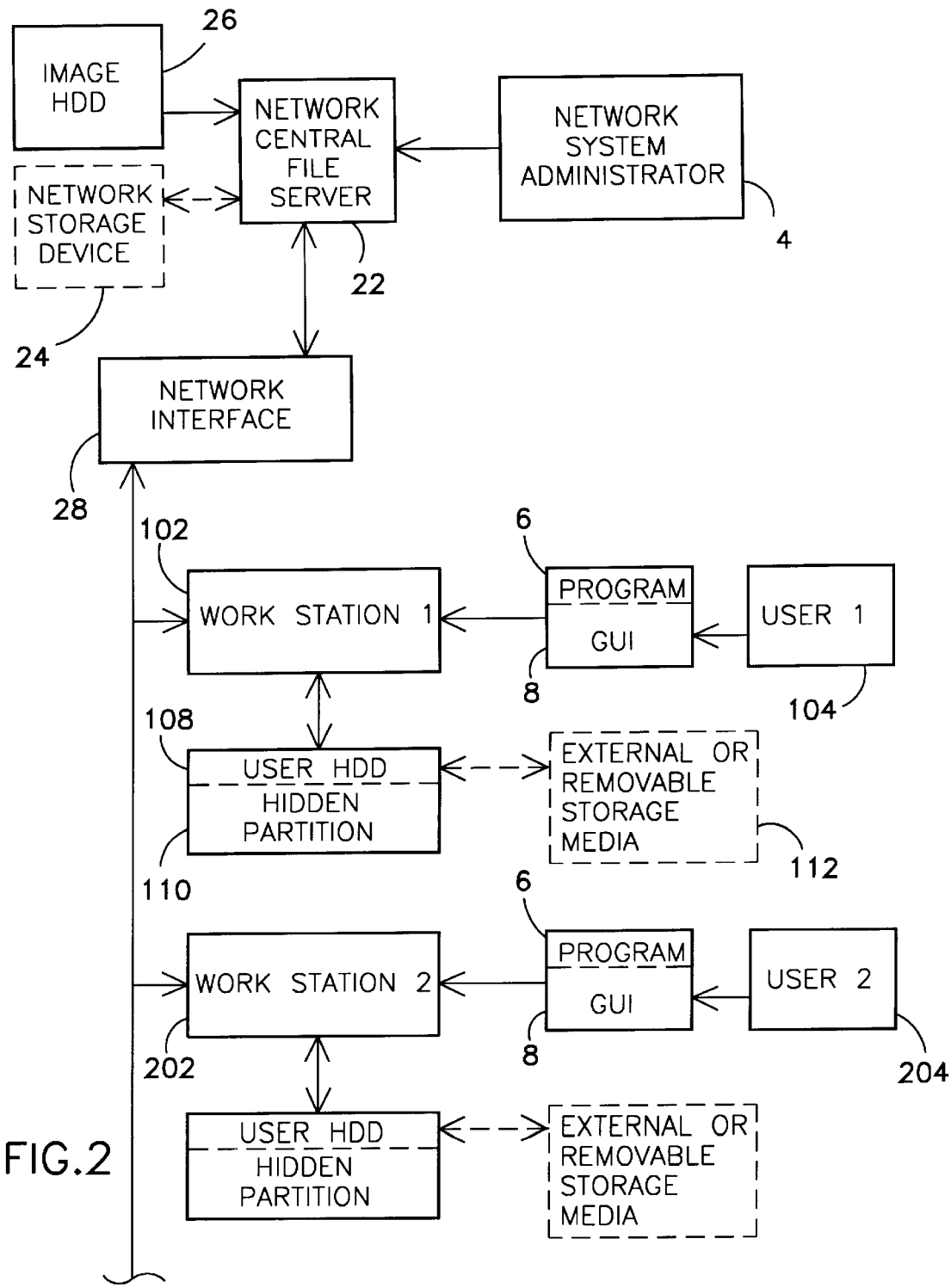
FIG. 2 is an illustrative flow chart block diagram of one of the preferred embodiments of the present invention apparatus.

Referring to FIGS. 1 and 2, one of the preferred embodiments of the present invention will be described as follows:

1. When the process begins at 2, the systems administrator 4 operates the present invention software program 6 which has a user friendly interface 8 and sends the software program 6 as an e-mail attachment to all users 104, 204, etc., who are upgrade candidates at their respective personal computer workstation 102, 202, etc,. By way of example, the upgrade may be to replace an existing Windows® 95 or Windows® NT system with a Windows® 98 system.
2. The systems administrator 4 also creates a system override configuration file 10 which is sent to all users' workstations. For example, the systems administrator can insist that certain files be saved even if the individual users may not see the need for them.
3. Each user 104 invokes the implementation of the software program 6 through the program's user friendly interface 8.
4. The user friendly interface 8 is, for example, a graphical user interface (GUI) which guides the user 104 through the process of selecting all of the user's personal files 106 to be saved. As will be discussed, the GUI 8 enables the user 104 to select all files that are associated with a particular application, such as Microsoft® Word, etc. The GUI 8 may also allow the user to make his or her selections by all known file extensions such as ".doc", or by traditional methods of picking and choosing each particular selected file to be saved, such as by the file directories.
5. When the entire selection process of all files to be saved is completed, the user 104 hits a "Done" button. The software program 6 creates a configuration file 12 which contains classifications and other definitions of the system overriding settings contained in system configuration file 10 and the user's personal files 106.
6. The software program 6 then allows an optional operation 18 which may be cloning, backup, store, restore, etc. For example, the program can notify the user 104 that his/her HDD 108 will be upgraded with a new operating system, e.g. Windows® 98 on a specified time, such as at midnight that day, and reminds the user 104 NOT to shut down his or her workstation 102.
7. At the scheduled time, the software program "wakes-up" the workstation 102, performs the file storing function 14 to compress the user's files into a compressed image file 16, and reboots the workstation 102 in preparation for the cloning operation.
8. The software program has an option of utilizing an existing or creating a new hidden partition 110 on the user's HDD 108, so that the saved compressed image files 16 are transferred and stored into the hidden partition. Alternatively, the saved compressed image files 16 are transferred to the network's central file server 22 through the network interface 28 to be saved on a network storage media 24 such as a server HDD. Still alternatively, the saved file 16 may be stored on a local storage media 112 such as a tape backup drive.
9. As an example of the optional file operation, cloning process 18 can take place on the user's HDD 108 and all non-saved files are overwritten, making room on the HDD 108 for the new operating system. As a result the new operating system such as Windows® 98 is then installed onto the user's HDD 102.
10. The saved files from either the hidden partition 110 on the HDD 108 or from the network storage media 24 or from the external or removal storage media 112 are then restored onto the user's HDD 108 during a restoration process 20.

It is noted that the present invention can be utilized in connection with any workstation operations, such as backup, storage, restoring, storing, cloning, upgrading, reconfiguration, etc, and it does not have to be associated with a cloning process.

Defined in detail, the present invention is a method of utilizing a computer software program to implement a process of duplicating complete hard disk drive contents to a multiplicity of workstation hard disk drives over a network, comprising the steps of: (a) creating a collection of upgrade hard disk drive contents on a single personal computer; (b) creating a system overriding file containing system overriding settings; (c) saving an image of the collection of upgrade hard disk drive contents on a network server; (d) selecting user files to be saved; (e) generating a configuration file containing classifications and definitions of the system overriding file and the selected user files; (f) storing the selected user files; (g) duplicating the image of the collection of upgraded hard disk drive contents from the server to the multiplicity of hard disk drives over the network; and (h) restoring the stored selected user files back to the multiplicity of hard disk drives; (i) whereby the method provides a fast, easy and convenient way to upgrade the multiplicity of hard disk drives while saving the user selected files from being altered during the duplication process.

Defined broadly, the present invention is a method of utilizing a computer software program to implement a process of performing optional file operations on a hard disk drive, comprising the steps of: (a) creating a system overriding file; (b) selecting user files to be saved; (c) generating a configuration file containing classifications and definitions of the system overriding file and the selected user files; (d) storing the selected user files; (e) duplicating the image of the collection of hard disk contents to the hard disk drive; and (f) restoring the stored selected user files back to the hard disk drive; (g) whereby the method provides a fast, easy and convenient way to perform the system operation on the hard disk drive while preventing the user selected files from being altered during the file operation process.

Defined more broadly, the present invention is a method of utilizing a computer software program to implement a process of performing optional file operations to a data storage media, comprising the steps of: (a) selecting user files to be saved; (b) storing the selected user files; (c) performing the optional file operation to the data storage media; and (d) restoring the stored selected user files back to the data storage media; (e) whereby the method provides a fast, easy and convenient way to perform the to the data storage media while preventing the user selected files from being altered during the file operation process.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A method of utilizing a computer software program to implement a process of duplicating complete hard disk drive contents to a multiplicity of workstation hard disk drives over a network, comprising the steps of:
   a. creating a collection of upgrade hard disk drive contents on a single personal computer;
   b. creating a system overriding file containing system overriding settings;
   c. saving an image of said collection of upgrade hard disk drive contents on a network server;
   d. selecting user files to be saved;
   e. generating a configuration file containing classifications and definitions of said system overriding file and said selected user files;
   f. storing said selected user files;
   g. duplicating said image of said collection of upgrade hard disk drive contents from said network server to said multiplicity of hard disk drives over said network; and
   h. restoring said stored selected user files back to said multiplicity of hard disk drives;
   i. whereby said method provides a fast, easy and convenient way to upgrade said multiplicity of hard disk drives while saving said selected user files from being altered during said duplication process.

2. The method as defined in claim 1, wherein said step of selecting user files to be saved includes the sub-step of selecting user files based on their association with an application.

3. The method as defined in claim 1, wherein said step of selecting user files to be saved includes the sub-step of selecting user files based on their file name extensions.

4. The method as defined in claim 1, wherein said step of selecting user files to be saved includes the sub-step of selecting user files based on their directory location.

5. The method as defined in claim 1, wherein said step of storing said selected user files includes the sub-step of storing said selected user files on a network storage media.

6. The method as defined in claim 1, wherein said step of storing said selected user files includes the sub-step of storing said selected user files on a local storage media.

7. The method as defined in claim 1, wherein said step of storing said selected user files includes the sub-step of storing said selected user files in an existing hidden partition in said multiplicity of workstation hard disk drives.

8. The method as defined in claim 1, wherein said step of storing said selected user files includes the sub-step of creating a hidden partition on said multiplicity of workstation hard disk drives for storing said selected user files in said hidden partition.

9. The method as defined in claim 1, wherein said step of storing said selected user files includes the sub-step of compressing said selected user files into a compressed file.

10. The method as defined in claim 1, wherein said step of duplicating includes the sub-step of copying said system overriding file onto said multiplicity of hard disk drives.

11. A method of utilizing a computer software program to implement a process of performing optional file operations on a hard disk drive, comprising the steps of:
    a. creating a system overriding file;
    b. selecting user files to be saved;
    c. generating a configuration file containing classifications and definitions of said system overriding file and said selected user files;
    d. storing said selected user files;
    e. duplicating an image of a collection of hard disk contents to said hard disk drive; and
    f. restoring said stored selected user files back to said hard disk drive;
    g. whereby said method provides a fast, easy and convenient way to perform said optional file operations on said hard disk drive while preventing said selected user files from being altered during said process of performing optional file operations.

12. The method as defined in claim 11, wherein said step of selecting user files to be saved includes the sub-step of selecting user files based on their association with an application.

13. The method as defined in claim 11, wherein said step of selecting user files to be saved includes the sub-step of selecting user files based on their file name extensions.

14. The method as defined in claim 11, wherein said step of selecting user files to be saved includes the sub-step of selecting user files based on their directory location.

15. The method as defined in claim 11, wherein said step of storing said selected user files includes the sub-step of storing said selected user files on a network storage media.

16. The method as defined in claim 11, wherein said step of storing said selected user files includes the sub-step of storing said selected user files on a local storage media.

17. The method as defined in claim 11, wherein said step of storing said selected user files includes the sub-step of storing said selected user files in an existing hidden partition in said hard disk drive.

18. The method as defined in claim 11, wherein said step of storing said selected user files includes the sub-step of creating a hidden partition on said hard disk drive for storing said selected user files in said hidden partition.

19. The method as defined in claim 11, wherein said step of storing said selected user files includes the sub-step of compressing said selected user files into a compressed file.

20. The method as defined in claim 11, wherein said step of duplicating includes the sub-step of copying said system overriding files onto said hard disk drive.

21. A method of utilizing a computer software program to implement a process of performing optional file operations to a data storage media, comprising the steps of:
    a. selecting user files to be saved;
    b. generating a configuration file containing classifications and definitions of shad selected user files;
    c. storing said selected user files;
    d. performing said optional file operations to said data storage media; and f. restoring said stored selected user files back to said data storage media;

g. whereby said method provides a fast, easy and convenient way to perform said optional file operations on said data storage media while preventing said selected user files from being altered during said process of performing optional file operations.

22. The method as defined in claim 21, wherein said step of selecting user files to be saved includes the sub-step of selecting user files based on their association with an application.

23. The method as defined in claim 21, wherein said step of selecting user files to be saved includes the sub-step of selecting user files based on their file name extensions.

24. The method as defined in claim 21, wherein said step of selecting user files to be saved includes the sub-step of selecting user files based on their directory location.

25. The method as defined in claim 21, wherein said step of storing said selected user files includes the sub-step of storing said selected user files on a network storage media.

26. The method as defined in claim 21, wherein said step of storing said selected user files includes the sub-step of storing said selected user files on a local storage media.

27. The method as defined in claim 21, wherein said step of storing said selected user files includes the sub-step of storing said selected user files in an existing hidden portion in said data storage media.

28. The method as defined in claim 21, wherein said step of storing said selected user files includes the sub-step of creating a hidden portion on said data storage media for storing said selected user files in said hidden portion.

29. The method as defined in claim 21, wherein said step of storing said selected user files includes the sub-step of compressing said selected user files into a compressed file.

30. The method as defined in claim 21, wherein said step of duplicating includes the sub-step of copying a system overriding file onto said data storage media.

* * * * *